US009408102B2

United States Patent
Axmon et al.

(10) Patent No.: US 9,408,102 B2
(45) Date of Patent: Aug. 2, 2016

(54) INTER-CARRIER MEASUREMENT TECHNIQUE

(75) Inventors: Joakim Axmon, Kävlinge (SE); Peter Alriksson, Hörby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 14/125,342

(22) PCT Filed: Oct. 21, 2011

(86) PCT No.: PCT/EP2011/005332
§ 371 (c)(1),
(2), (4) Date: Jan. 27, 2014

(87) PCT Pub. No.: WO2012/171542
PCT Pub. Date: Dec. 20, 2012

(65) Prior Publication Data
US 2014/0146699 A1   May 29, 2014

Related U.S. Application Data

(60) Provisional application No. 61/496,115, filed on Jun. 13, 2011.

(51) Int. Cl.
*H04W 24/10* (2009.01)
*H04W 36/00* (2009.01)
(Continued)

(52) U.S. Cl.
CPC .......... *H04W 24/10* (2013.01); *H04W 36/0094* (2013.01); *H04W 36/14* (2013.01); *H04W 76/048* (2013.01); *H04W 84/12* (2013.01)

(58) Field of Classification Search
CPC .......................... H04W 36/0094; H04W 24/10
USPC ........................................................ 370/252
See application file for complete search history.

(56) References Cited

U.S. PATENT DOCUMENTS

| 2008/0085710 A1* | 4/2008 | Prateek | H04L 43/16 455/436 |
| 2009/0180451 A1* | 7/2009 | Alpert | H04W 72/1215 370/338 |
| 2010/0041384 A1* | 2/2010 | Kazmi | H04W 88/10 455/419 |

FOREIGN PATENT DOCUMENTS

| EP | 2242300 A1 | 10/2010 |
| EP | 2367385 A1 | 9/2011 |

(Continued)

OTHER PUBLICATIONS

Unknown, Author. "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)." 3GPP TS 36.300 V9.7.0. Mar. 2011.

(Continued)

*Primary Examiner* — Stephen J Clawson
(74) *Attorney, Agent, or Firm* — Murphy, Bilak & Homiller, PLLC

(57) ABSTRACT

A technique for scheduling an inter-carrier measurement in a communication network serving a mobile device (200) over a serving carrier is provided. As to a method aspect of the technique, a method (400) comprises the steps performed by the mobile device of publishing (410) a measurement interval, requesting (420) radio time and scheduling (430) the inter-carrier measurement based on the at least one request. The published measurement interval is a measurement interval on the serving carrier. The measurement interval is published to a multiplicity of measurement managing components (110, 112, 114, 116). Each of the measurement managing components is associated with at least one carrier. At least one of the measurement managing components submits a request for radio time. The technique thus allows for a more scalable implementation of a plurality of different carriers or radio access technologies.

26 Claims, 12 Drawing Sheets

(51) Int. Cl.
  *H04W 84/12* (2009.01)
  *H04W 36/14* (2009.01)
  *H04W 76/04* (2009.01)

(56) References Cited

FOREIGN PATENT DOCUMENTS

| WO | 2008041832 A1 | 4/2008 |
|---|---|---|
| WO | 2008085952 A1 | 7/2008 |

OTHER PUBLICATIONS

Unknown, Author. "Measurement Gap Scheduling." QUALCOMM Europe. R2-063103. 3GPP TSG-RAN WG2 #56. Nov. 6-10, 2006. Riga, Latvia.
Unknown, Author. "Scheduling of LTE measurement gaps for inter-frequency and inter-RAT monitoring." Nokia, Nokia Siemens Networks. R4-081074. 3GPP TSG-RAN WG4 Meeting #46bis. May 4-9, 2008. Kansas City, USA.
3GPP, "3rd Generation Partnership Project; Technical Specification Group GSM/EDGE Radio Access Network; Radio subsystem link control (Release 10)", 3GPP TS 45.008 V10.0.0, Mar. 2011, 1-148.
3GPP, "3rd Generation Partnership Project; Technical Specification Group Radio Access Network; Evolved Universal Terrestrial Radio Access (E-UTRA); Requirements for support of radio resource management (Release 10)", 3GPP TS 36.133 V10.2.0, Mar. 2011, 1-416.
3GPP, "3rd Generation Partnership Project; Technical Specification Group Radio Access Network; Requirements for support of radio resource management (FDD) (Release 10)", 3GPP TS 25.133 V10.1.0, Mar. 2011, 1-254.
3GPP, "3rd Generation Partnership Project; Technical Specification Group Radio Access Network; Requirements for support of radio resource management (TDD) (Release 10)", 3GPP TS 25.123 V10.1.0, Apr. 2011, 1-449.
Unknown, Author, "E-UTRA Measurements and Cell Reselection Considerations", Nokia Siemens Networks, Nokia, 3GPP TSG-RAN WG2 Meeting #58bis, R2-072386, Orlando, USA, Jun. 25-29, 2007, 1-5.
Unknown, Author, "Measurement gap control", NTT DoCoMo, Inc., 3GPP TSG RAN WG2 Ad Hoc on LTE, Tdoc-R2-061922, Cannes, France, Jun. 27-30, 2006, 1-10.
Unknown, Author, "Measurement gap creation", Samsung, 3GPP TSG RAN2#53, R2-061364, Shanghai, China, May 8-12, 2006, 1-2.
Unknown, Author, "Measurement Gap scheduling in HO procedure in LTE", Huawei, 3GPP TSG RAN2 #52, Tdoc R2-060860, Athens, Greece, Mar. 27-31, 2006, 1-3.
Unknown, Author, "Measurements for LTE Intra- and Inter-RAT Mobility", NTT DoCoMo, Inc., 3GPP TSG RAN WG2 #50, R2-060086, Sophia Antipolis, France, Jan. 9-13, 2006, 1-5.
Unknown, Author, "Scheduling of LTE measurement gaps for inter-frequency and inter-RAT monitoring", Nokia, Nokia Siemens Networks, 3GPP TSG-RAN WG4 Meeting #46bis, R4-080758, Shenzhen, China, Mar. 30-Apr. 4, 2008, 1-5.
Unknown, Author, "Scheduling of the gap-assisted cell search and measurements", Nokia Corporation, Nokia Siemens Networks, 3GPP TSG-RAN WG4 Meeting #45, R4-071837, Jeju, South Korea, Nov. 5-9, 2007, 1-4.

* cited by examiner

460

INTER-CARRIER MEASUREMENT TECHNIQUE

TECHNICAL FIELD

The present disclosure relates to inter-carrier measurements in a communication network. More specifically, and not by way of limitation, the disclosure relates to a technique for scheduling inter-carrier measurements in a communication network supporting a plurality of different Radio Access Technologies.

BACKGROUND

Data volumes communicated using mobile terminals are steadily increasing. Associated with the increased demand for mobile date exchange is a steady technical progress as defined, e.g., by the standards for the Global System for Mobile Communications (GSM), Universal Mobile Telecommunications Systems (UMTS) and Long Term Evolution (LTE), which improve data rates and user capacities. A result of the technical evolution is the coexistence of different generations of mobile communication standards. By way of example, a communication network may cover contiguous or overlapping areas by means of technically different Radio Access Technologies (RATs). In order to facilitate the mobility of the mobile device in the area covered by the communication network, the mobile terminal carries out cell search and other measurements (so-called "mobility measurements"), by which the terminal can move from cell to cell in a seamless fashion while, e.g., monitoring a paging channel or being engaged in a data transfer or voice call.

Therefore, it would be desirable for modern mobile terminals to comprise a multi-RAT modem that simultaneously supports up to three RATs. The situation is, however, complicated by measurement requirements, which have to be fulfilled for each of the supported RATs, and which may not only differ for each of the supported RATs, but may also depend on the RAT of a currently serving cell.

Existing mobile terminals typically contain only two so-called stacks for supporting, e.g., GSM and UMTS Terrestrial Radio Access (UTRA FDD), respectively. For two stacks it is possible to yield radio time for measuring on a carrier of the other currently non-serving RAT using a fixed scheduling on Discontinuous Reception (DRX) cycles or idle frames, e.g. in the GSM connected mode. However, as the number of supported RATs increases, the existing technique is no longer feasible. The existing methods of yielding radio time for mobility measurements require knowledge of the radio time needed by the other non-serving RAT. Hence, deriving such a fixed scheduling is becoming increasingly complicated due to the exponentially increasing combinatory complexity of the many schedules for each supported RAT. The complexity increases with the number of supported RATs, the number of monitored carriers for each RAT, a current DRX cycle length, etc.

In addition to the required mobility measurements for each supported RAT, there are further activities requiring radio time. Such activities include system information acquisition either in an idle mode, e.g. in an UTRA FDD Cell Paging Channel state or UTRA Registration Area Paging Channel state (URA-PCH state) having a shortest paging cycle of 80 ms, or in a connected mode using autonomous gaps that may overlap the measurements gaps, e.g. in a connected mode of evolved UMTS Terrestrial Radio Access (e-UTRAN connected mode). Another example of activities that may disturb, or be disturbed by, the conventional scheduling techniques includes a support for a dual Subscriber Identity Module (dual SIM support) or support for different network providers.

International application PCT/EP2011/054093 (published as WO 2011/113919) claiming the priority of applications EP 10 002 939.6 and U.S. 61/318,530 addresses a problem related to the fact that e-UTRA measurement gaps are short, which may affect the mobility measurement, and suggests scheduling measurements on the same e-UTRA carrier in consecutive or temporarily nearby measurement gaps. However, this technique does not take into account if the RAT requirement for, e.g., GSM includes reconfirming of a cell during the time of the consecutive measurement gaps. Potentially, the time occupied by the consecutive measurement gaps would have been the last opportunity to fulfil measurement performance requirements of GSM. Latter scenario primarily applies whenever GSM is not the currently serving RAT. Generally, failing to reconfirm a cell in the correct time period may entail formal and/or technical consequences. First, such a mobile device may fail a conformance test and may not be type approved. A Type Allocation Code (TAC), which is included as initial 8 digits of the 15-digit International Mobile Equipment Identity (IMEI) code, is however necessary to uniquely identify the mobile device. Second, the mobile device may have lost the GSM cell in the scenario without being aware thereof, which may have an impact on the mobility of the mobile device.

The conventional scheduling technique may, particularly in the presence of the other activities, harm certain carriers more than other carriers. At least under certain conditions, a more graceful degradation may be desirable, so that essentially all measured carriers experience a slight degradation rather than one or few carriers being subject to a severe degradation.

SUMMARY

There is a need for a technique that enables a mobile device to handle a plurality of channels, such as a plurality of Radio Access Technologies.

According to a one aspect, a method of scheduling an inter-carrier measurement in a communication network serving a mobile device over a serving carrier is provided. The method comprises the steps, performed by the mobile device, of publishing a measurement interval of the serving carrier to a multiplicity of measurement managing components, each of which is associated with at least one carrier; requesting, by at least one of the measurement managing components, radio time for the published measurement interval; and scheduling the inter-carrier measurement based on the at least one request.

The measurement interval of the serving carrier may include a measurement interval on the serving carrier or a measurement interval available on the serving carrier. The measurement interval may be internally published to the multiplicity of measurement managing components. The internal publication may include a communication within the mobile device. The internal publication may be transparent for the communication network. The measurement interval may be published via a control unit connected to each of the multiplicity of measurement managing components. The mobile device may comprise the control unit and/or the measurement managing components. The measurement managing components may be co-located with the mobile device. The request may be a request for radio time. The requested radio time may include a part of the measurement interval or may completely encompass the measurement interval.

In some implementations, the multiplicity of measurement managing components may be realized by several units or entities. In some other implementations, the multiplicity of measurement managing components may be combined fully or by parts.

The publication may allow each of the measurement managing components to request the radio time for the at least one carrier associated with the respective measurement managing component. The method may further comprising the step of assessing whether or not the radio time is needed for a measurement on the associated at least one carrier. Each of the measurement managing components may individually perform the assessing. At least one of the assessing and the requesting may be triggered by the publication. Each of the measurement managing components may assess independently and/or in a parallelized manner, whether or not to request the radio time in the published measurement interval. Each of the measurement managing components may decide to request the radio time for the published measurement interval, if the associated carrier expects or requires the inter-carrier measurement to be performed in or until the published measurement interval and/or before a later measurement interval. In case the associated carrier does not yet expect or require the inter-carrier measurement in the published measurement interval and/or a later inter-carrier measurement in the next or a subsequent measurement interval fulfils requirements of the associated carrier, the measurement managing components may decide to cede the published measurement interval (e.g., to a carrier associated with another measurement managing component), or to postpone the inter-carrier measurement until the next or a subsequent measurement interval.

Each of the multiplicity of the measurement managing components may request radio time, e.g. depending on the assessment. Each of the multiplicity of the measurement managing components may, e.g. depending on the assessment, submit a separate request. Each of the at least one request may include an indicator of a dynamic priority level of the requested radio time. The inter-carrier measurement may be scheduled depending on the dynamic priority level of the at least one request. The request may be granted (which may include the scheduling) or may be rejected for the published measurement interval. Alternatively or in addition, the request may be postponed to another measurement interval.

The measurement interval may relate to a future measurement interval. The published measurement interval may be a next measurement interval scheduled and/or usable for measurements outside the serving carrier. The published measurement interval may, at least for the mobile device, be given or predetermined. E.g., the published measurement interval may be determined by the serving carrier and/or the communication network. The measurement interval may be one out of a series of measurement intervals provided on the serving carrier and/or by the communication network. The measurement intervals may be periodically provided on the serving carrier.

Some or all of the carriers may differ in at least one of a carrier frequency and a Radio Access Technology (RAT). The inter-carrier measurement may be an inter-frequency measurement and/or inter-RAT measurement. In certain embodiments, the technique may allow, even for more than two different carriers or even for more than two different Radio Access Technologies (RATs), to efficiently sequence inter-carrier measurements within given measurement intervals. The inter-carrier measurements may be scheduled while the mobile device is served over the serving carrier. In some of the embodiments, the technique may enable the mobile device to efficiently track or administer two, three or more RATs.

The serving carrier or a serving RAT (i.e., the RAT to which the serving carrier belongs) may also be referred to as an active carrier and an active RAT, respectively. The serving may include at least one of monitoring a paging on the serving carrier and transmitting data and/or voice signals on the serving carrier. The serving of the communication network may include providing wireless access to the communication network using at least the serving one of the carriers. The inter-carrier measurement may facilitate a cell hand-over of the mobile device.

The requesting may be performed by each of at least two of the measurement managing components. Each of the at least two requests may include an indicator of a dynamic priority level of the requested radio time. The scheduling of the inter-carrier measurement may depend on the dynamic priority levels of the at least two requests.

The at least two requests may be in conflict, e.g. if corresponding at least two inter-carrier measurements are required by their respective carriers within the announced measurement interval. In some embodiments, such a conflict may be solved and/or a more graceful degradation may be achievable by means of the dynamic priority level included in the request. The dynamic priority level may reflect different levels of a measurement requirement of the associated carrier. The scheduling may take account of the different levels. In some embodiments the multiplicity of carriers may experience a slight degradation rather than one or few carriers experiencing a sever degradation.

The dependency on the dynamic priority levels of the at least two requests may include a comparison of the dynamic priority levels. The inter-carrier measurement may be scheduled for the carrier associated with the measurement managing component which request indicates the highest dynamic priority level. The request indicating the highest dynamic priority level of the at least two requests may be granted. Alternatively or in addition, the request indicating a second-highest dynamic priority level or a lower dynamic priority level of the at least two requests may be rejected.

The dynamic priority level (e.g., of a subsequent request) may be increased in response to a rejected request and/or reduced in response to a granted request. The dynamic priority level may be computed as a base priority plus a number of unsuccessful requests of the requesting measurement managing component.

Each of the measurement managing components may further be associated with at least one RAT. The associated RAT may include, or may be compatible to, one of GSM, UMTS (e.g., UTRA FDD) and e-UTRA (or LTE). Each of the at least one carrier associated with the respective measurement managing component may be a carrier of the further associated at least one RAT. Some or all measurement managing components may be associated with more than one RAT (also referred to as "multi-RAT components"). Alternatively or in addition, some or all measurement managing components may be associated with only one RAT. A measurement managing component associated with one RAT may be referred to as a "RAT-specific component". Further, there may be a redundancy as to one or more RATs supported by the mobile device. Two or more of the measurement managing components may be associated with the same RAT. Alternatively, each supported RAT may be uniquely associated with one measurement managing component. The measurement managing components may be RAT-specific without redundancy.

The multiplicity of measurement managing components may include a measurement managing component associated with the serving carrier and/or the serving RAT. The measurement interval may also be published to the measurement managing component of the serving RAT. The measurement managing component of the serving RAT may be adapted to request the radio time for an inter-carrier measurement of the serving RAT, e.g. for cell reselection.

Carriers associated with different measurement managing components may differ in at least one of frequency and RAT. Each of the carriers may be defined by its frequency. Different carriers may have different frequencies. Some or all measurement managing components may be associated with more than one carrier (also referred to as "multi-carrier components"). Some or all of the multi-carrier components may be a RAT-specific component. Alternatively, each of the measurement managing components may be associated with one of the carriers of the communication network ("carrier-specific components"). Further, different carrier-specific components may be associated with different carriers. The association of carriers to measurement managing components may be unique (or bijective). Two RATs may differ if the two RATs use distinct carriers or frequencies of radio communication. Alternatively or in addition, two RATs may differ if the two RATs apply technically incompatible communication protocols.

Each measurement managing component may be responsible for all inter-carrier measurements towards at least one of the associated at least one carrier and the associated RAT. The different RATs may include at least two of GSM, UTRA FDD, and e-UTRA. E-UTRA is also referred to as Long Term Evolution (LTE). E-UTRA may include at least one of e-UTRA FDD and e-UTRA TDD.

The method may further comprise determining at least one of a measurement rate, a duration for the requested radio time, and the dynamic priority level for each of the at least one request. The determination may be individually performed by each of the requesting measurement managing components. Alternatively or in addition, the measurement rate may be determined by the communication network. The measurement rate may be configured for each carrier and/or each RAT. The measurement rate may be defined in terms of the measurement interval of the serving carrier, e.g. in terms of a frequency of the series of measurement intervals. The radio time may be requested (e.g., as a result of the assessing), if the radio time is required to maintain the measurement rate (which is also referred to as a "feed-forward mechanism").

Each of the measurement managing components may maintain a finite history of at least one of its requests and on its inter-carrier measurements. The maintaining may include at least one of storing and updating the history. At least one of the assessing and the determining may depend on the history. The determining of the dynamic priority level may depend on the history. E.g., the increasing and/or the decreasing of the dynamic priority level may depend on the history. Alternatively or in addition, the radio time may be requested (e.g., as a result of the assessing), if the history indicates an average rate that is lower than the measurement rate (which is also referred to as a "feedback mechanism").

At least one of the assessing and the determining may depend on at least one of the serving carrier, a state of the serving carrier, a configuration of the serving carrier, a number of carriers, and any combination thereof. E.g., at least one of the assessing and the determining may depend on at least one of a RAT of the serving carrier, a Radio Resource Control (RRC) state of the of the serving carrier, a connection cycle configuration of the serving carrier, a measurement interval configuration of the serving carrier, a number of carriers measured for the RAT of the serving carrier versus all measured carriers, and any combination thereof.

The request may further include the requested radio time. The request may indicate a time interval for the requested radio time, e.g. a starting time and/or a duration. Alternatively or in addition, the request may further include one or more parameters of the associated carrier and/or the associated RAT. The request may indicate a radio frequency of each of the associated at least one carrier. The requested radio time may be scheduled depending on the dynamic priority level only in the case of a conflict between the at least two requests. The conflict between the at least two requests may include an overlap of the indicated at least two time intervals.

The method may further comprise the step of queuing, for each of some or all measurement managing components, internal requests of the respective measurement managing component. The queuing may be implemented as an internal pre-selection or internal scheduling. "Internal" may mean "within" or "related to" the corresponding measurement managing component. The internal requests may include period tasks. The internal requests may be queued prior to submitting the request. The internal requests may be queued in a round-robin fashion or by any other means. The queuing may include selecting one of the internal requests for the submission. Each of some or all of the measurement managing components may include a gate function adapted to the queuing.

The scheduling may include signalling a grant in response to the requested radio time to the requesting measurement managing component. The method may further comprise the step of configuring a physical layer subsystem to carry out the requested or granted inter-carrier measurement. Each of some or all of the requesting measurement managing component may be adapted to perform the configuration in response to the grant. The physical layer subsystem may be adapted to carry out the requested inter-carrier measurement on the associated carrier and/or according to the associated RAT.

The measurement interval may include at least one of a transmission gap, a measurement gap, a Forward Access CHannel (FACH) Measurement Occasion gap (FMO gap), a discontinuous reception cycle (DRX cycle) of the serving carrier, an idle frame, an idle time, a measurement period according to the Long Term Evolution standard, and any other interval usable for measurements.

The method may further comprise any step or feature mentioned below in the context of a product aspect or an apparatus aspect.

According to another aspect, a computer program product is provided. The computer program product comprises program code portions for performing one or more of the steps or one or more of the method aspects described herein, when the computer program product is executed on one or more computing devices, in particular, one or more components of a microprocessor. The computer program product may be stored on a computer-readable recording medium, such as a permanent or rewritable memory. The computer program product may also be provided for reception or download via the communication network and/or one or more other computer networks, such as the Internet, a cellular telecommunication network or a wireless or wired Local Area Network (LAN).

According to a further aspect, an apparatus for scheduling an inter-carrier measurement in a communication network serving a mobile device over a serving carrier is provided. The apparatus comprises a multiplicity of measurement managing components, each of which is associated with at least one carrier and adapted to request radio time; a serving connection control component adapted to publish a measurement interval of the serving carrier to the multiplicity of measurement managing components, wherein at least one of the measurement managing components is adapted to request radio time for the published measurement interval; and a radio scheduler adapted to schedule the inter-carrier measurement based on the at least one request.

Each of the at least one request may be submitted to the radio scheduler. The apparatus may further comprise a control unit configured for internal communications. The control unit may be connected to each of the multiplicity of measurement managing components. The apparatus may further comprise a multiplicity of connection control components. The control unit may further be connected to each of the multiplicity of connection control components. Each of the connection control components may be associated with at least one of the carriers and the RATs. Each of the connection control components may be adapted to process data according to the associated carrier and/or associated RAT. The data processing may include at least one of receiving, decoding, encoding, and transmitting according to the associated carrier and/or the associated RAT.

The apparatus may further comprise any component or feature mentioned above in the context of the method aspect or the product aspect. The apparatus may further be adapted to, or may further comprise a component adapted to, perform one or more of the steps mentioned above in the context of the method aspect.

BRIEF DESCRIPTION OF THE DRAWINGS

Further aspects and advantages of the technique presented herein will become apparent from the description of preferred embodiments with reference to the accompanying drawings, wherein.

DETAILED DESCRIPTION

In the following description, for purposes of explanations and not limitation, specific details are set forth, such as specific communication paths and a specific handling of component internal variables in order to provide a thorough understanding of the technique disclosed herein. It will be apparent to one skilled in the art that the technique may be practiced in other embodiments that depart from these specific details. Moreover, while the following embodiments will primarily be described in relation to GMS, UMTS and its LTE extension, it will be readily apparent that the technique described herein may also be practiced in the context of other communication network standards and standard combinations. Furthermore, while in the following reference will be made to Discontinuous Reception (DRX) cycles, the technique disclosed herein can also be implemented in the context of any other negotiated, scheduled or even random phases in which data transfer occurs.

Those skilled in the art will further appreciated that the methods, steps, functions and components explained herein may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that, while the following embodiments are primarily described in the form of methods and devices, the technique disclosed herein may also be embodied in a computer processor and a memory coupled to the processor, wherein the memory stores one or more programs that perform the steps discussed herein when executed by the processor.

The skilled person will also note that the components and units described herein are conceptual. In some implementations, each of the components and units can be realized by several other components, units or entities, or can be combined fully or to parts. Moreover, functionalities such as memories, units for transfer to and from memories, etc. that are known to one skilled in the art have not been mentioned for the conciseness of the description.

Figure 1:
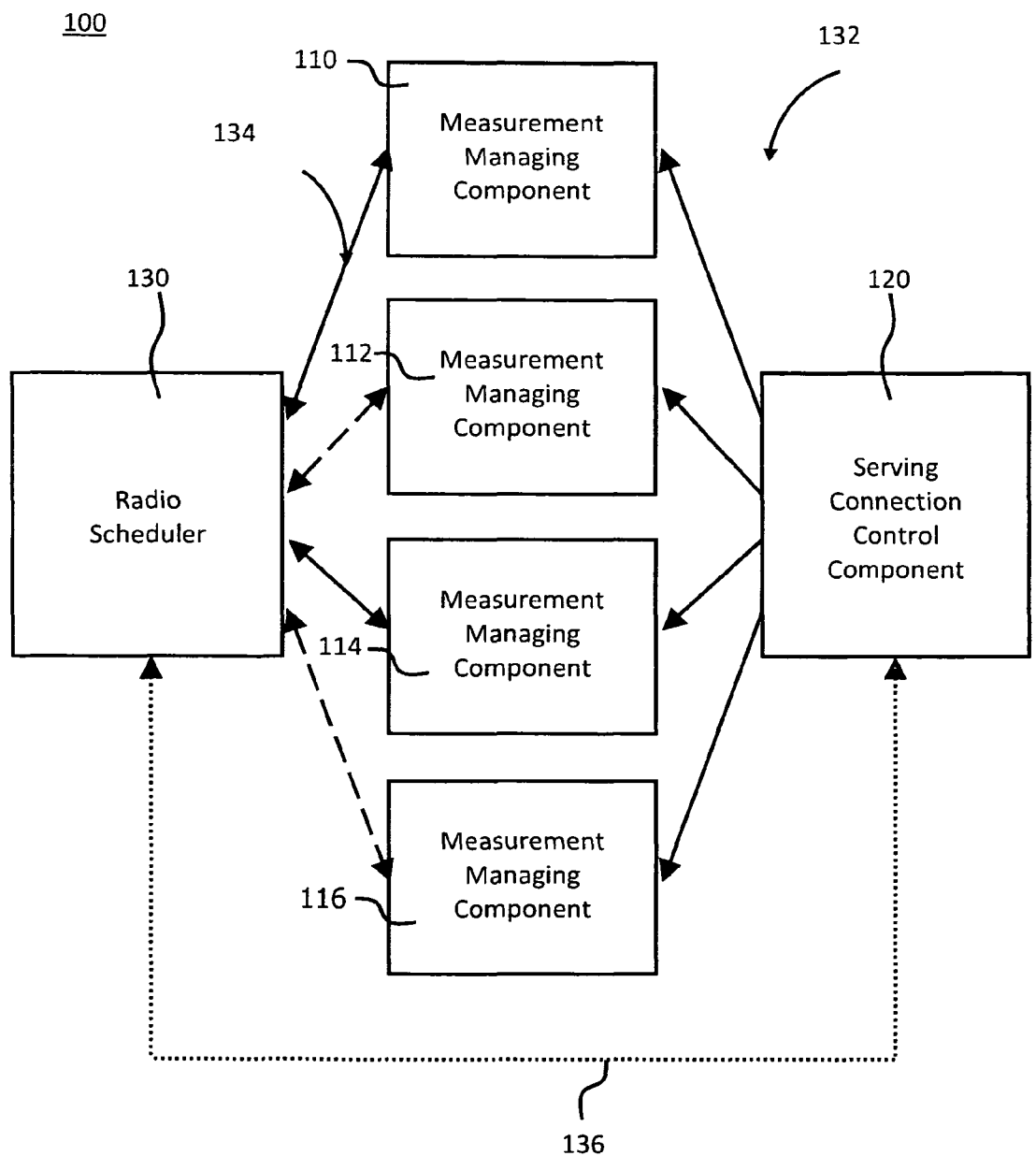
FIG. 1 schematically illustrates an apparatus for scheduling an inter-carrier measurement in a communication network serving a mobile device over a serving carrier according to a device embodiment.

FIG. 1 shows an embodiment of an apparatus 100 for scheduling an inter-carrier measurement in a communication network serving a mobile device over a serving carrier. The apparatus 100 comprises a plurality of measurement managing components 110, 112, 114 and 116, each of which is associated with one of the Radio Access Technologies (RATs) supported by the mobile device. The apparatus 100 further comprises a serving connection control component 120 that is responsible for a currently active connection using one of the RATs, which is also referred to as the serving RAT or active RAT, over at least one carrier, which is also referred to as the serving carrier or active carrier, of the serving RAT. The apparatus 100 further comprises a radio scheduler 130 that decides upon request received from one or more of the measurement managing components 110-116, to which of the supported RATs radio time is assigned for performing an inter-carrier measurement.

The serving connection control component is at least unidirectionally connected to each of the measurement managing components 110, 112, 114 and 116. The at least unidirectional connections 132 are used by the serving connection control component 120 for announcing or publishing an upcoming measurement interval on the serving carrier, such as a transmission gap between DRX cycles or a dedicated measurement gap. The radio scheduler 130 has bidirectional connections 134 to each of the measurement managing components 110-116. The bidirectional connections 134 are used by the measurement managing components 110-116 to submit a request for radio time in the upcoming measurement interval to the radio scheduler 130. The radio scheduler 130 uses the bidirectional connections 134 to reply an indication as to whether the request is granted or rejected to the requesting measurement managing component. For a certain measurement interval published by the serving connection control component 120, all of the measurement managing components 110-116 can request radio time. In a realistic situation, not all of the measurement managing components 110-116 request radio time, as is indicated by dashed double-arrows in the bidirectional connections 134.

In a variant of the apparatus 100 shown with a dotted line in FIG. 1, the serving connection control component 120 and the radio scheduler 130 have a mutual connection 136. The connection 136 is used by the serving connection control component 120 to publish the measurement interval also to the radio scheduler 130. The publication includes further details of a time frame of the measurement interval, such as a starting time, an ending time and a duration of the measurement interval. Depending on a duration of the radio time requested by the measurement managing components 110-116 in comparison to the duration of the published measurement interval, the radio scheduler 130 grants one or more than one request for the same measurement interval.

Figure 2:
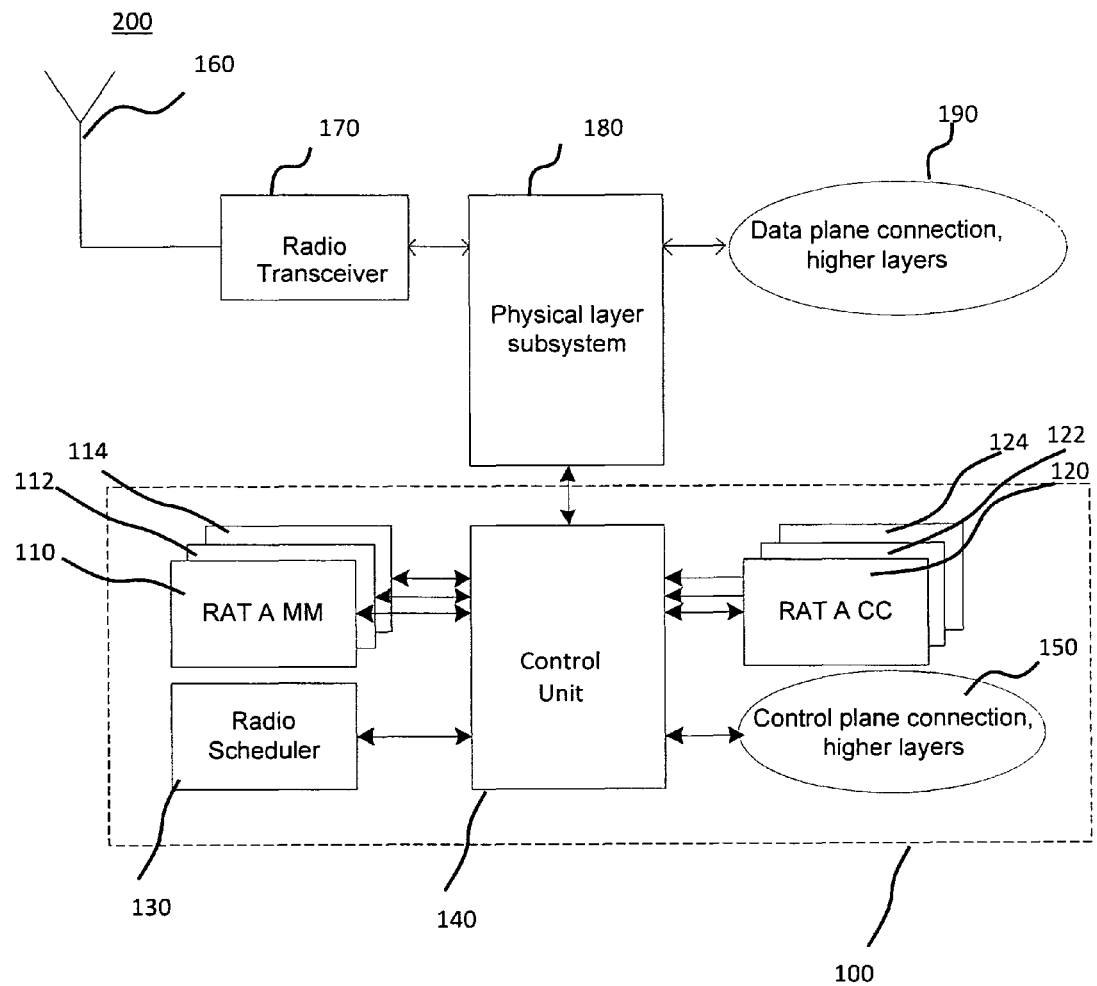
FIG. 2 schematically illustrates a mobile device including the apparatus of FIG. 1.

FIG. 2 shows further details of the apparatus 100. The apparatus 100 further comprises a plurality of connection control components 120, 122 and 124. The apparatus 100 further comprises a control unit 140 connected to each of the measurement managing components 110-114, the connection control components 120-124 and the radio scheduler 130. The control unit 140 has a connection 150 to a control plane and higher layers of data processing. In addition to the embodiment of the apparatus 100 shown in FIG. 1, the control unit 140 carries out message routing between the connected measurement managing components 110-114, connection control components 120-124, the radio scheduler 130 and the control plane 150. Optionally, the control unit 140 also provides other functions.

Each of the connection control components 120-124 is associated with one of the supported RATs. Each of the connection control components 120-124 is responsible for controlling a data plane processing according to the associated RAT. In other words, the apparatus 100 comprises for each of the supported RATs one measurement managing component 110, 112 or 114 and one connection control component 120, 122 or 124. The data plane processing performed by each of the connection control components 120-124 according to its associated RAT includes, e.g., reception, decoding, transmission and encoding of channels for the associated RAT.

Throughout the drawings, "RAT X MM" is a short-hand notation for the measurement managing component associated with the RAT X. Similarly, "RAT X CC" is a short-hand notation for the connection control component associated with the RAT X.

The connection control component takes measurement intervals on a carrier of the associated RAT into account, such as, e.g., a Discontinuous Reception measurement gaps, transmission gaps, idle frames, and/or Forward Access Channel (FACH) Measurement Occasion gaps (FMO gaps). Each of the connection control component 120-124 can take on the role of the serving connection control component 120 described with reference to FIG. 1. The next measurement interval on the serving carrier of the associated serving RAT is the published measurement interval. All other connection control components 122 and 124, which associated RAT is currently not serving (or "passive"), take measurement intervals on carriers of their associated RATs into account when deciding upon whether to request radio time in the published measurement interval or not, as described in more detailed below.

The apparatus 100 may be employed in any device, wherein several periodical or quasi-periodical activities are carried out, or are to be carried out, using a constrained resource. The apparatus 100 is described in what follows in the context of a mobile device, such as a mobile terminal or user equipment (UE) as exemplary application.

FIG. 2 shows the apparatus 100 embedded in a mobile device 200. The mobile device 200 further comprises one or more antennas 160, which are coupled to a radio transceiver 170, and a physical layer subsystem 180 connected to the radio transceiver 170 and the control unit 140. The physical layer subsystem 180 includes hardware accelerators and DSPs that support a multi-mode operation of the radio transceiver 170. Network applications performed by the mobile device 200 are organized in layers, namely the control plane 150 and a data plane 190 (also referred to as a forwarding plane). Data packets received by the mobile device 200 and requiring a high-level processing are sent to the control plane 150. Received data packets, which can be dealt with based on their existing state, are forwarded to the faster data plane 190.

The mobile device 200 may perform mobility measurements by means of the apparatus 100. Mobility measurements are controlled by the mobile device 200, by the communication network serving the mobile device 200 or by both. In the first case, the mobile device receives system information, broadcasted by the communication network, regarding a carrier frequency of a potential neighbour cell. The system information optionally includes identifiers of such neighbour cells. Mobility measurements are planned by the mobile device 200 (and not predefined by the communication network) under the constraint that cell reselection is carried out to the correct cell within the correct time frame. Measurements are typically carried out in unused parts of the DRX cycles, e.g., UTRA or e-UTRA idle mode states, which are not used for a monitoring of paging channels.

In the second case, the communication network configures each mobility measurement to be carried out and reported by the mobile device 200 using a dedicated signalling. Here, the mobile device 200 has to fulfil requirements on measurement accuracy and on event evaluation. The measurement accuracy requires, e.g., a minimum rate at which the measurements are carried out. The event evaluation includes, e.g., evaluating that the neighbour cell becomes stronger than the serving cell. Measurements are typically carried out in transmission gaps (e.g., in the case of UTRA as the serving RAT) or in measurement gaps (e.g., in the case of e-UTRA being the serving RAT). Within the constraints of the network configuration, the mobile device 200 plans the mobility measurements itself using the available gaps in e-UTRA or in GSM. In UTRA FDD, each gap is associated with a measurement purpose such as the inter-RAT measurement "e-UTRA measurement". Thus, the communication network is in control of the planning of the mobility measurements with the only detail left to be decided by the mobile device 200 being which inter-frequency carrier to measure in a particular measurement interval, in case there are several carriers to be measured.

The third case includes states such as UTRA FDD Cell FACH, wherein the mobility measurement is controlled by the mobile device 200, but periodic measurements are ordered by, and reported to, the communication network. Those measurements have to fulfil the same measurement accuracy requirements as for the network-controlled mobility (according to above second case). The ordered measurements are carried out in reserved Transmission Time Intervals (TTIs). The mobile device 200 plans the measurement itself under the constraint that cell reselection behaviour and measurement accuracy requirements are fulfilled.

The apparatus 100 enables the mobile device 200 to schedule its inter-frequency and inter-RAT measurement activities in a dynamic and distributed fashion. "Distributed" means that the different measurement managing components 110-116 are at least functionally independent. Each RAT supported by the mobile device 200 is represented by one of the measurement managing components 110-116, each of which is responsible for all measurements towards that associated RAT. For example, the measurement managing component 114 is associated with the RAT of e-UTRA and thus responsible for e-UTRA cell search, RSRP and RSRQ measurements, regardless of whether a serving cell belongs to an e-UTRA network or not.

Each of the measurement managing components 110-116 determines, within the above or some other limitations, how often to carry out measurements and how much radio time to request and use for each measurement occasion. The rate at which measurements are carried out may be determined with respect to DRX cycles or available measurements gaps. When determining the measurement rate and the radio time, each of the measurement managing components 110-116 takes into account at least one of the following information:
- a RAT to which the serving cell belongs;
- a Radio Resource Control state (RRC state) of the mobile device 200, which includes for example an idle state, a connected state, an UTRA FDD Cell FACH state, etc.;
- a configuration of a DRX cycle or of a paging cycle;
- a configuration of an idle frame, of idle time of a transmission gap, of a measurement gap or of an FMO gap;
- a number of measured carriers for the RAT associated with the measurement managing component versus all carriers measured by the apparatus 100; and
- any other configuration or combination of configurations at least potentially having an impact on the applicable measurement requirements or on how the applicable measurements requirements can be used.

The applicable measurements requirements include measurement requirements defined for the associated RAT. The measurement requirements for e-UTRA are inter alia defined in the standard documents 3GPP TS 25.123, "Requirements for support of radio resource management (TDD)", Version 10.2.0; 3GPP TS 25.133, "Requirements for support of radio resource management (FDD)", Version 10.2.0; 3GPP TS 36.133, "Evolved Universal Terrestrial Radio Access (E-UTRA) and Requirements for support of radio resource management", Version 10.2.0; 3GPP TS 45.008, "Technical Specification Group GSM/EDGE Radio Access Network; Radio subsystem link control", Version 10.1.0.

Figure 3:
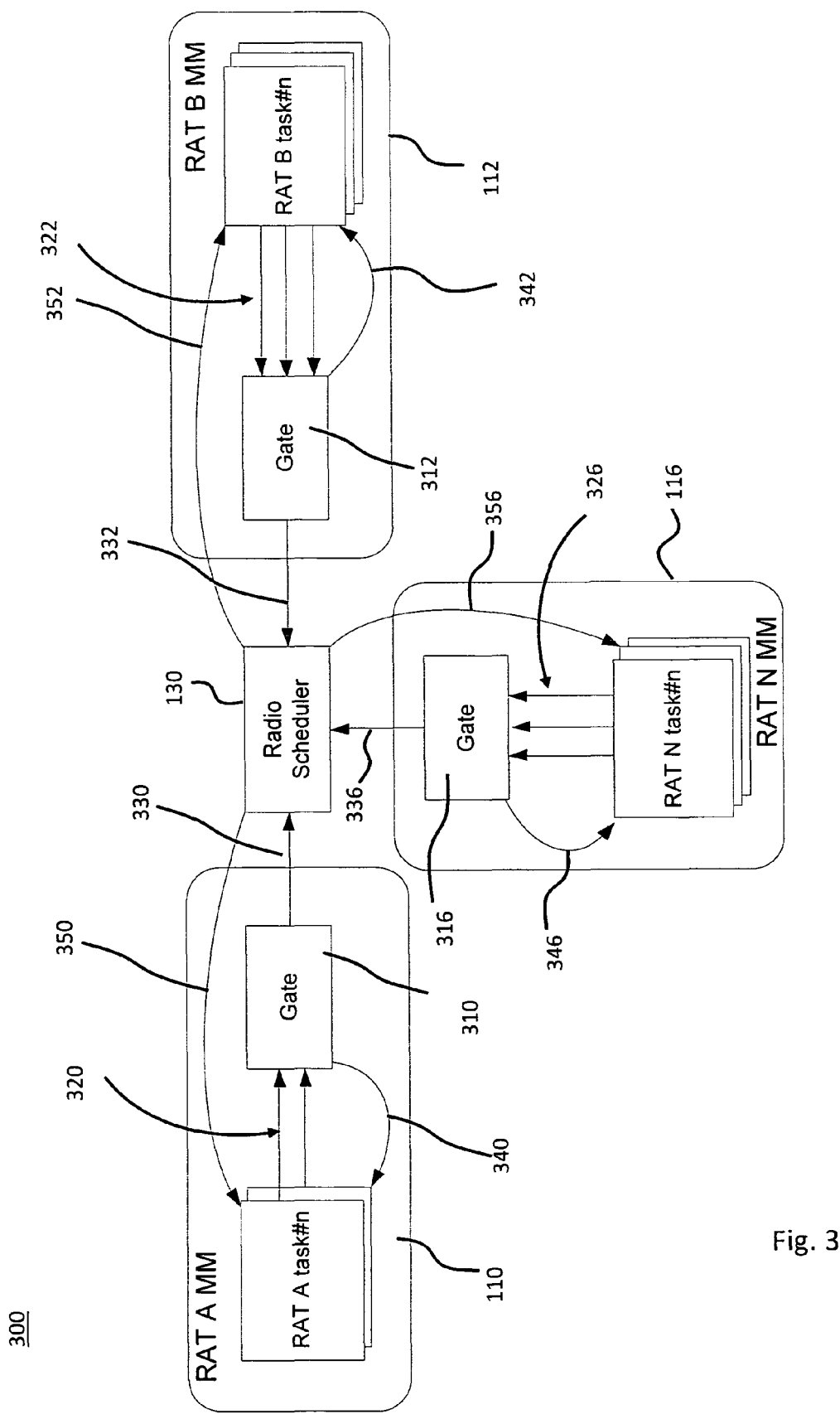
FIG. 3 schematically illustrates further details of the apparatus shown in FIG. 1.

FIG. 3 schematically illustrates further details of a more advanced embodiment of the apparatus 100 shown in FIG. 1 or 2. Each of the measurement managing components 112-116 has to perform tasks requiring radio time within a predetermined time window or with a predetermined rate. The measurement intervals published by the serving connection control component 120 may be frequent enough to perform the task in the subsequent or a later measurement interval. Some of the tasks, such as the periodic tasks, can be planned ahead or prearranged by the corresponding measurement managing component 110, 112, 114 or 116. In order to avoid that radio time is requested for more than one or even all tasks (which are known in advance to the corresponding measurement managing component) to be performed in the same published measurement interval, e.g. during the same DRX cycle, each measurement managing component 110-116 further comprises a gate function 310, 312 and 316, respectively. The gate function may be implemented as a hardware interface in each of the measurement managing components 110-116, each interface being connected to the radio scheduler 130. Alternatively, the gate function is implemented by software. The gate function schedules internal requests 320, 322, 326 (i.e., requests for the tasks of the corresponding measurement managing component) in a round-robin fashion or by some other means. Such other means includes a gate function that prioritizes the tasks according to specific needs of the associated RAT. Diagram 300 schematically illustrates a flow of internal requests 320, 322, 326 queued by the gate functions 310, 312 and 316, respectively. The internal request having the highest internal priority is forwarded as an external request 330, 332 and 336 to the radio scheduler 130. The gate function 310, 312 or 316 provides an internal feedback 340, 342, 346 as to grant or rejection of the internal requests 320, 322, 326, respectively. The radio scheduler 130 provides an external feedback 350, 352 and 356 (also referred to as an "indication") as to grant or rejection of the external request 330, 332 and 336, respectively, as described in more detail below. The external requests are also referred to as "requests" for brevity.

Figure 4:
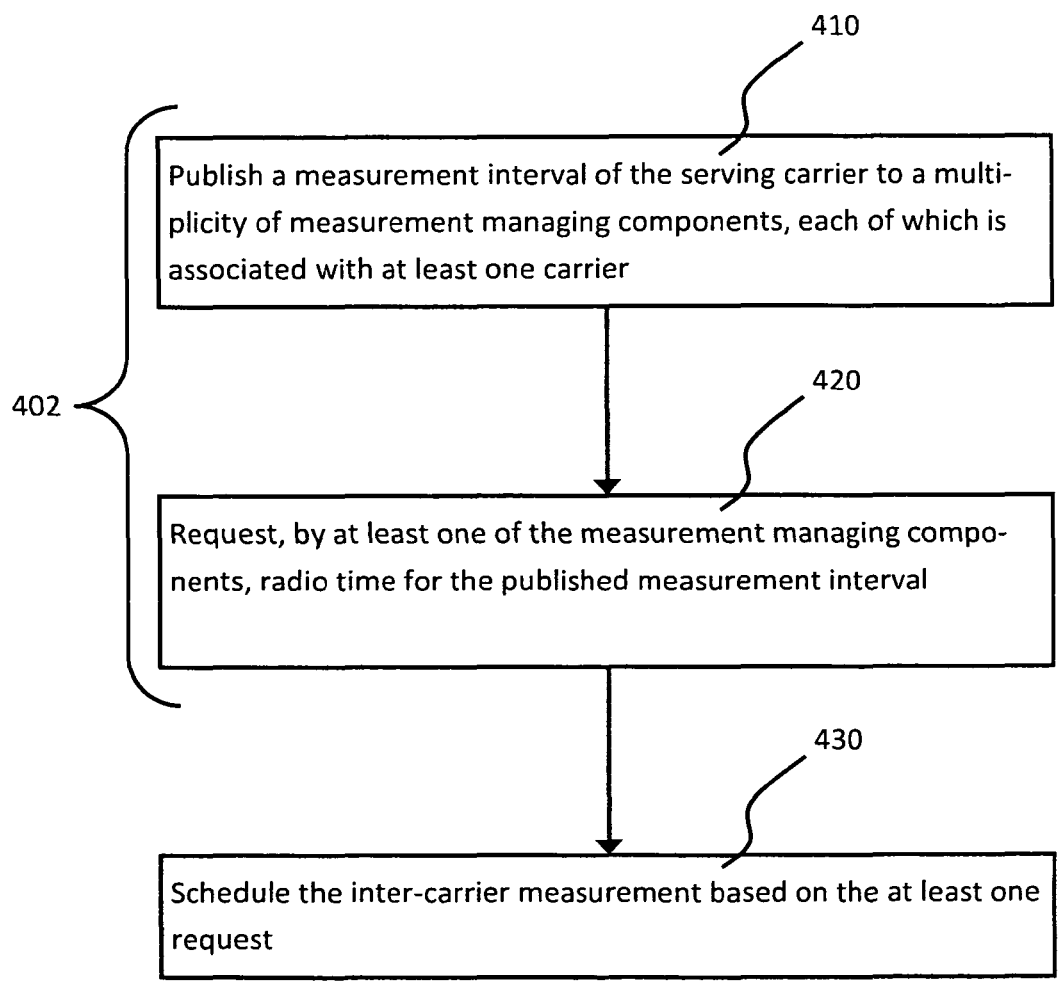
FIG. 4 shows a flowchart of a method of scheduling an inter-carrier measurement in a communication network serving the mobile device shown in FIG. 2 over a serving carrier according to a method embodiment performed by the apparatus shown in FIG. 1.

FIG. 4 shows a flowchart of a method 400 of scheduling an inter-carrier measurement in a communication network serving a mobile device over a serving carrier. The method 400 can be performed by the apparatus 100, as described with reference to each of the FIGS. 1 to 3 above. The mobile device can be the mobile device 200 shown in FIG. 2, or any other mobile device accessing the communication network.

The method 400 comprises a step 410 of publishing a measurement interval of the serving carrier to a multiplicity of measurement managing components 110-116. Each of the measurement managing components is associated with at least one carrier. The associated at least one carrier belongs to one RAT supported by the mobile device 200. The measurement managing component 110-116 of the apparatus 100 receive the published measurement interval. Triggered by the publication 410, at least one of the measurement managing components 110-116 requests radio time for the published measurement interval in a step 420. The at least one request may be submitted to the radio scheduler 130 of the apparatus 100, as described above. In a step 430, the inter-carrier measurement is scheduled based on the at least one request.

It is to be noted that inter-carrier measurements on the serving RAT are requested by the measurement managing component 110 associated with the serving RAT in the same way radio time for inter-carrier measurement on non-serving RATs (i.e., for inter-RAT measurements) are requested by the measurement managing components 112-116 of the associated non-serving RAT.

The apparatus 100 performing the method 400 is capable of handling more than two different RATs. Consequently, more than one of the associated measurement managing components 110-116 may request radio time in the published measurement interval. The radio scheduler 130 keeps track of the requests for radio time. In case the published measurement interval provides sufficient time for subsequently scheduling all of the requested radio times, the radio scheduler 130 grants all such requests.

In the case of two or more conflicting requests for radio time submitted for the same published measurement interval, the radio scheduler grants or rejects such requests. Each of the requests submitted by the measurement managing components 110-116 to the radio scheduler 130 includes a dynamic priority level. The dynamic priority level reflects how urgent it is to get the requested radio time. The dynamic priority level depends on the measurement requirements configured by the communication network and/or defined for the associated RAT. The dynamic priority is used by the radio scheduler 130 to decide whether to grant or reject the corresponding request for radio time in the case of conflicting requests. The dynamic priority thus provides a mechanism used when competing for radio time with another measurement managing component.

In the case of two or more conflicting requests, the request with the highest priority level gets granted and the one or more other requests are rejected by the radio scheduler 130. It is understood that the priority level can be implemented using any numerical definition of priority, e.g. including a low value meaning a high priority level. Optionally, the radio scheduler 130 handles requests of the different measurement managing components 110-116 differently in order to take needs specific to the associated RAT into account. An example for the RAT-specific needs is described in aforementioned application EP 10 002 939.6 (published as EP 2 367 385 on 21 Sep. 2011).

The steps 410 and 420 form a first part 402 of the method 400 that is triggered by the publication and described in more detail below with reference to FIGS. 5 and 6. The step 430 is triggered by the indication of the radio scheduler 130 and forms a second part of the method 400 described in more detail below with reference to the FIGS. 7 to 9. In a computer-implemented realization of the method 400, each of the first part 402 and the second part 430 can be implemented by an event handler triggered by the publication event and the indication event, respectively.

Figure 5:
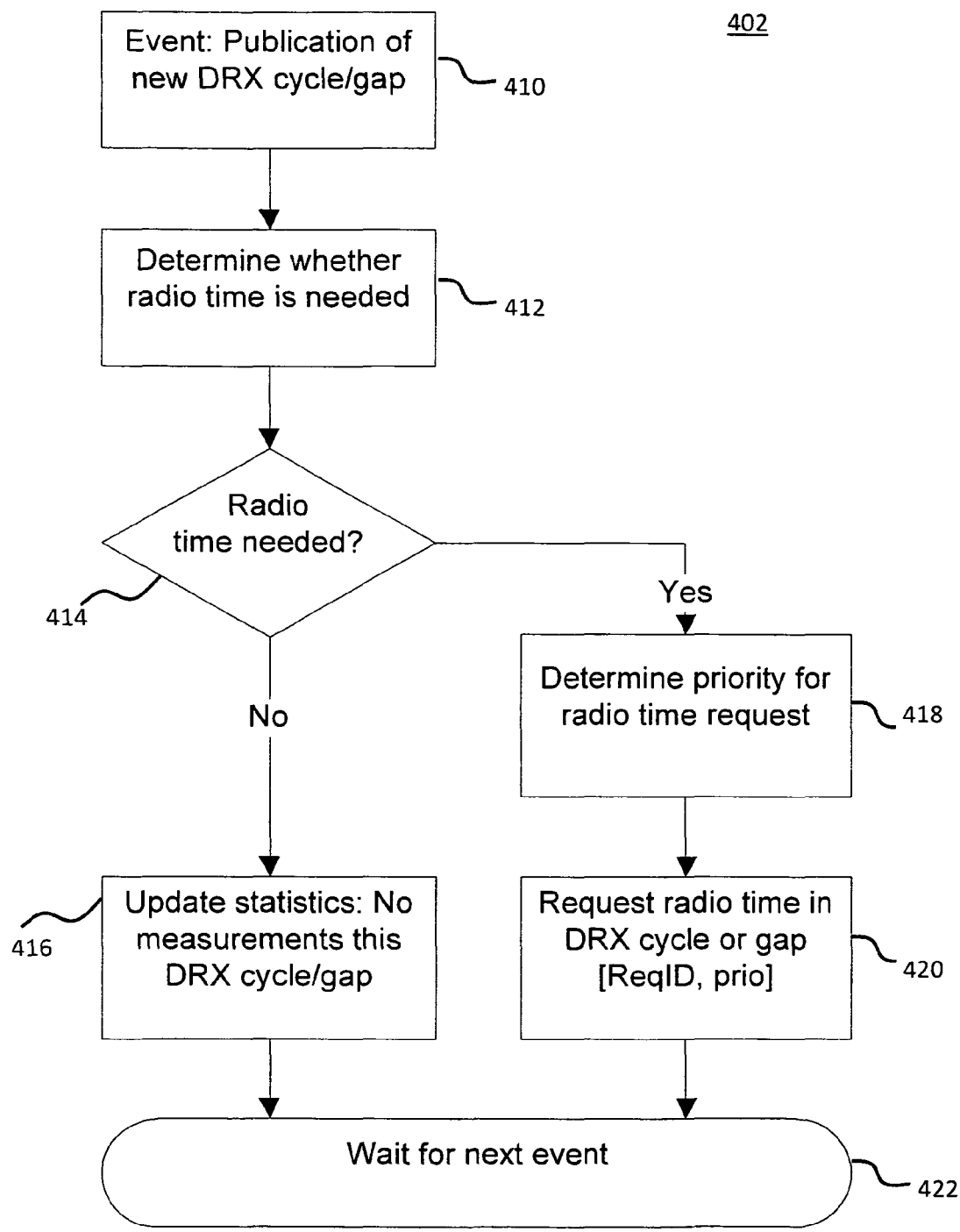
FIG. 5 shows a flowchart with details of a first part of the method of FIG. 4.

FIG. 5 shows a flowchart of the first part 402 of the method 400, which part is performed by each of the measurement managing components 110-116 upon the publication 410 of the measurement interval such as a DRX cycle or a measurement gap. The active or serving connection control component 120, i.e. the connection control component associated with the RAT to which the serving cell belongs, publishes in the step 410 a new DRX cycle, measurement gap or transmission gap as the measurement interval that can be used for measurements. The measurement managing components 110-116 associated with the different RATs are triggered by this publication. A simplified message sequence chart indicating actions and communications as a result of the first part 402 of the method 400 is shown in FIG. 6.

Each of the measurement managing components 110-116 (including the measurement managing component 110 associated with the serving RAT) accesses if radio time is needed for measurements in the upcoming measurement interval in a step 412. In case radio time is needed for the associated RAT, the method 400 branches at the symbol 414 to determine the dynamic priority level for the radio time request in a step 418, and example of which is described below with reference to FIG. 11. The requesting measurement managing component provides the dynamic priority level and a request identifier along with the needed radio time and other parameters potentially of relevance or interest for the decision by the radio scheduler 130. Such parameters include, e.g., a carrier frequency for the inter-carrier measurement intended to be performed in the requested radio time.

In case the measurement managing component decides in the branching step 414 that no radio time is needed in the published measurement interval, the corresponding measurement component 110, 112, 114 or 116 stores information in a step 416. The stored information updates statistics on the measurement activity of the corresponding measurement managing component. The information stored in the step 416 indicates that for the upcoming measurement interval no measurement is carried out and/or has to be carried out.

Figure 6:
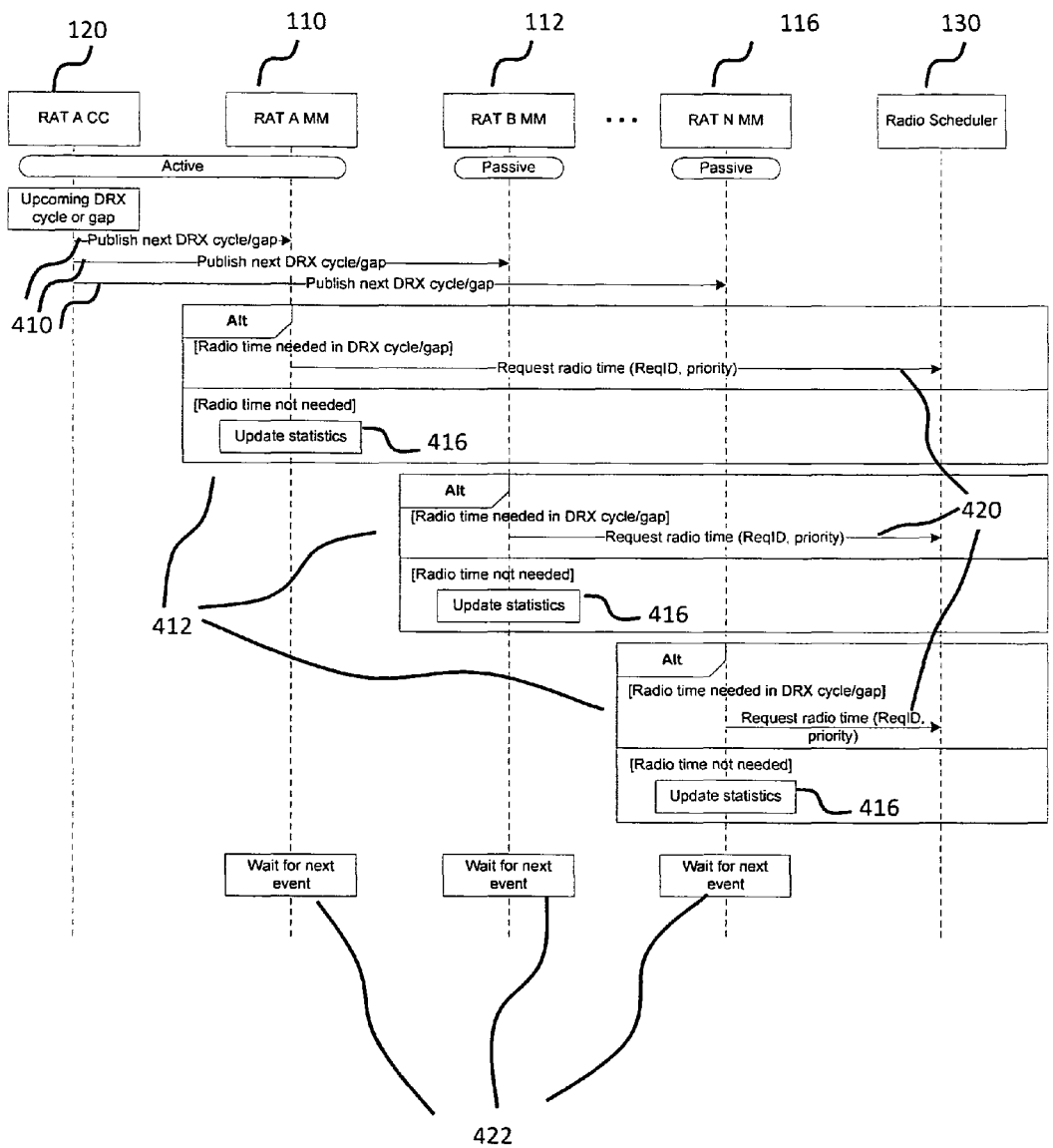
FIG. 6 illustrates a simplistic first message communication within the apparatus shown in FIG. 1 as a result of the first part of the method of FIG. 4.
Figure 7:
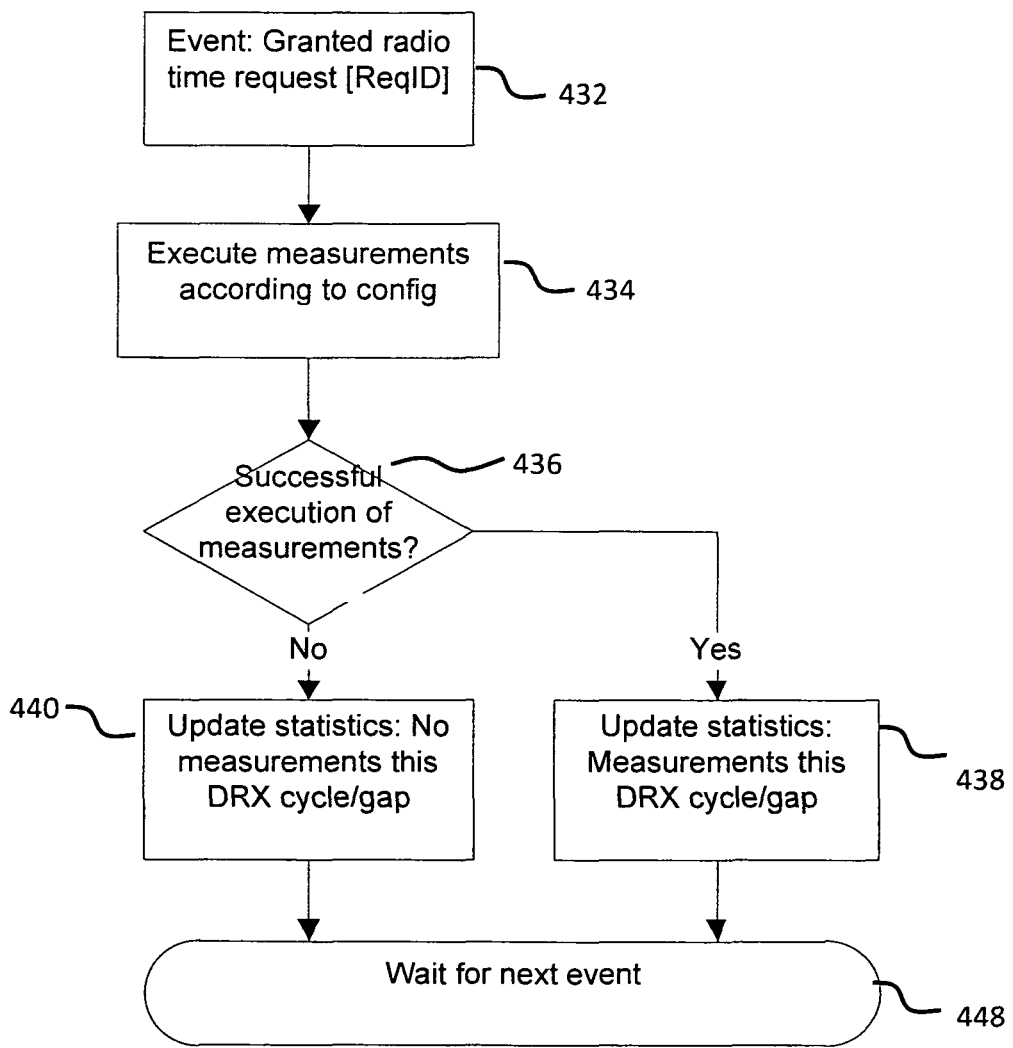
FIG. 7 shows a flowchart with details of a second part of the method of FIG. 4.

As shown in each of the FIGS. 5 and 6, all requesting measurement managing components 110-116 thereafter await a next trigger event in a state 422. The next trigger event includes a grant or a rejection of the requested radio time, which is shown in the FIGS. 7 and 8, respectively. A corresponding simplistic message sequence chart 900 is shown in FIG. 9. The message sequence chart 900 includes actions and communications in the apparatus 100 related to the outcome of the radio time request from the perspective of the measurement managing component 114. It is understood that each of the measurement managing components 110-116 having submitted a request for radio time is involved in a corresponding message communication as the one shown in the message sequence chart 900.

Figure 8:
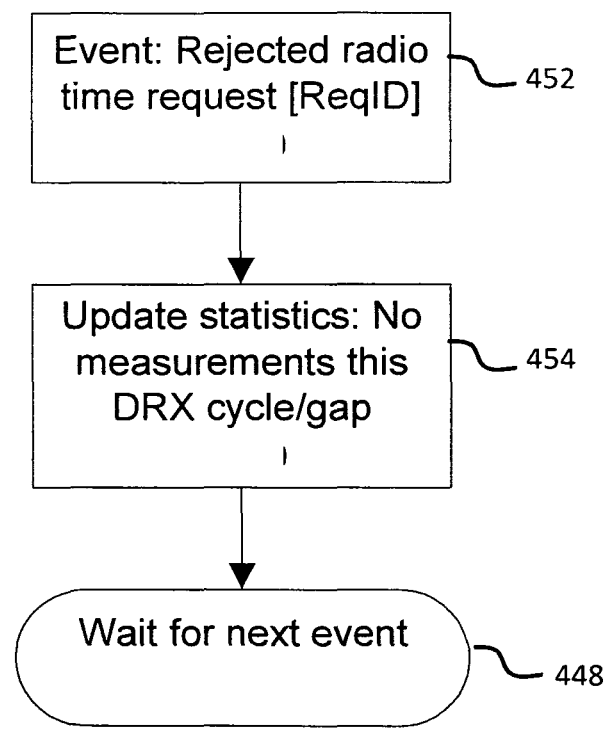
FIG. 8 shows a flowchart related to the second part of the method of FIG. 4 from a perspective of an unsuccessfully requesting measurement managing component in the apparatus shown in FIG. 1.
Figure 9:
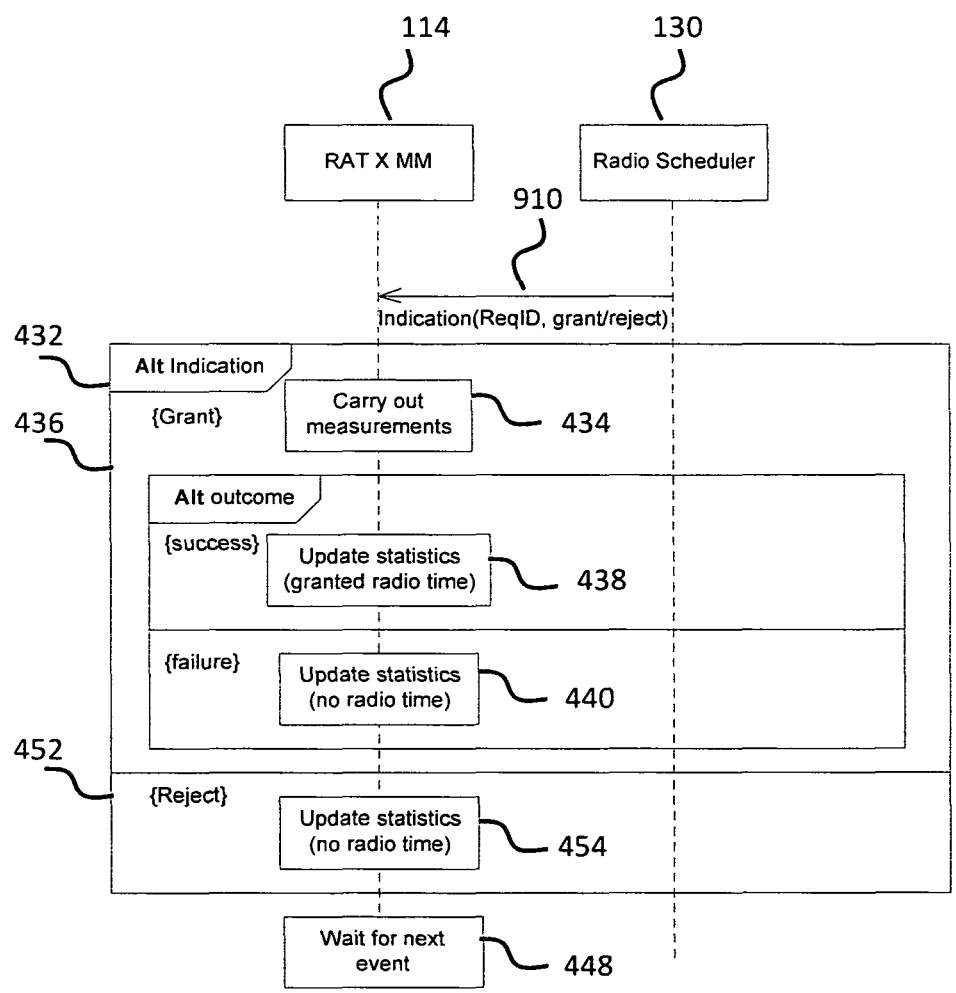
FIG. 9 illustrates a simplistic second message communication within the apparatus shown in FIG. 1 as a result of the second part of the method of FIG. 4.

The chart 900 schematically illustrates how a requesting measurement managing component 114 receives an indication 910 provided in the step 430 (shown in more detail in FIG. 7 as to the grant of the request) or in a further step 450 of the method 400 (shown in FIG. 8). The indication 910 provided by the radio scheduler 130 to the requesting measurement managing component 114 further includes the request identifier submitted along the request in the step 420. The request identifier is used by the requesting measurement managing component 114 to distinguish among different internal requests 320, 322, 326, as described above. The request identifier allows the indication 910 to be associated with a specific job or action.

The indication 910 signals the event "grant" which ends the waiting state 422 at the end of the first part 402 of the method 400 by triggering the step 432. The measurement managing component 114 configures the physical layer subsystem 180 to carry out one or more mobility measurements for the associated RAT in a step 434. The one or more measurements are executed according to the configuration on one carrier or a group of carriers of the associated RAT (which at least one carrier is also referred to as the at least one carrier associated with the measurement managing component). In case the one or more measurements are successfully completed according to branching point 436, the measurement managing component 114 stores information indicating that the one or more measurements have been carried out in the published interval, e.g. in the concerned DRX cycle or measurement gap, in a step 438.

The outcome of the configured and initialized measurements may indicate a failure. For example, the one or more measurements may be interrupted by one or more activities having a higher priority and involving radio usage. Such higher prioritized activities include, e.g., the system information acquisition ordered by the communication network, by which ordered time the one or more measurements are not fully or successfully completed. In this case, the measurement managing component 114 stores information indicating that the one or more measurements were not carried out in the published measurement interval, e.g. in the concerned DRX cycle or measurement gap, in a step 440.

Alternatively, the indication 910 may signal the event "reject" for the request identified by the indication 910, which also ends the waiting state 422 of the first part 402 of the method 400 and triggers the step 450 shown in FIG. 8. The step 450 can be implemented by a separate event handler. Upon reception of the rejection in a step 452 by the requesting measurement managing component 114, the measurement managing component 114 stores information indicating that measurements were not carried out in the published measurement interval, e.g. in the concerned DRX cycle or measurement gap, in a step 454.

Figure 10:
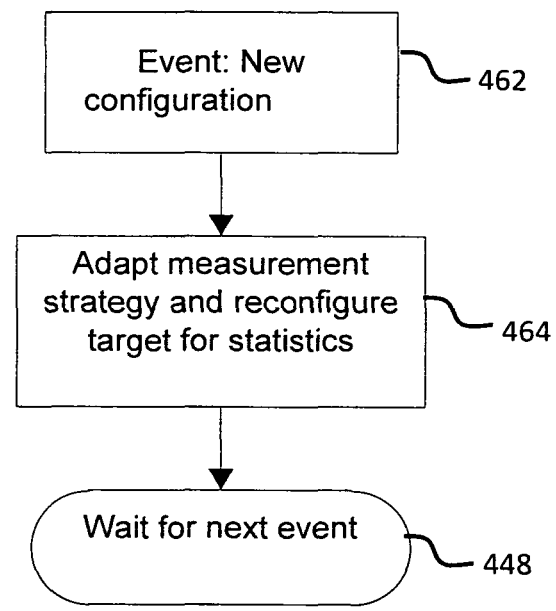
FIG. 10 shows a flowchart for a reconfiguration performed by each measurement managing component in the apparatus shown in FIG. 1.

FIG. 10 shows a flowchart of a further event handler for a reconfiguration 460. As pointed out above, each of the measurement managing components 110-116 takes a plurality of different information into account for determining a measurement rate, in the step 412 of assessing whether to request radio time or not, or for determining a duration of the requested radio time. The information may include a system configuration (e.g., the serving RAT, the serving cell, the DRX cycle, a gap configuration, etc.). Alternatively or in addition, the information may include a measurement configuration, e.g. in the case of mobility measurements controlled by the mobile device 200. Alternatively or in addition, the measurement configuration is also determined by the communication network, as pointed out above. Throughout, the system configuration and the network configuration are collectively referred to as the "configuration". A change of at least one of the measurement configuration and the system configuration in a step 462 triggers a step 464 of adapting a measurement strategy and/or reconfiguring a target for the statistics. The measurement strategy is implemented by a priority handling algorithm including parameters such as the measurement rate and the target.

Each of the event handlers for the successful scheduling 430, for the event "reject" 450 and for the event "reconfigure" 460 returns to a waiting state 448. In the waiting state 448 the measurement managing component 110, 112, 114 or 116 awaits the next event, such as the publication 410 of the next measurement interval.

The information stored in each of the steps 438, 440 and 454 includes a time stamp having a temporal granularity of at least the occurrences of the measurement intervals on the serving carrier. For example, the time stamp may include a consecutive number of the measurement intervals. Each of the measurement managing components 110-116 may store a predefined or initialized number N of the most recent time stamps, which is also referred to as a finite history or statistics.

The priority handling algorithm is performed independently by each of the measurement managing components 110-116. The priority handling algorithm has two functions. The first function is to assess, if radio time needs to be requested in order to maintain the configured measurement rate. The measurement rate is defined in terms of the measurement interval, e.g., in terms of the DRX cycles or measurement gaps. The first function thus performs the step 412 described above with reference to FIG. 5. The second function of the priority handling algorithm is to determine, if radio time is required, the dynamic priority level of the request. The second function performs the step 418 described above with reference to FIG. 5.

The priority handling algorithm bases the assessing and the determining on the finite history of radio time requests. The finite history indicates, for each publication 410 recorded in the finite history if a request was made, if a request was granted, if the request was granted but measurements could not be completed, or if the request was rejected.

The priority handling algorithm may be performed independently for each measurement managing component 110-116 associated with one RAT. Alternatively or in addition, the priority handling algorithm may be performed independently for each measurement managing component 110-116 associated with only one carrier. In case all carriers of one RAT are associated to one of the measurement managing components 110-116, i.e. in the case of RAT-specific measurement managing components 110-116, each of the measurement managing components 110-116 may implement one independent instance of the priority handling algorithm for each periodic task that needs to be executed by the corresponding measurement managing component. For example, there may be one instance of the priority handling algorithm implemented for each inter-frequency carrier. By way of example, in each of the measurement managing component 112 associated with the RAT of UTRA and the measurement managing component 114 associated with the RAT of e-UTRA, one instance may be used for each inter-frequency carrier.

In a variant, one or each of the measurement managing components 110-116 have one instance of the priority handling algorithm for several periodic tasks, e.g., for several associated carriers, and adjusts the configuration, e.g. the measurement rate etc., to the number of carriers to be measured.

The priority handling algorithm comprises two routines. The first routine "ph_Request" performs the two functions. The second routine "ph_Feedback" supports the first routine. The first routine ph_Request determines whether radio time is needed or not, and if so, at which dynamic priority level. The second routine ph_Feedback receives a feedback for updating the finite history or statistics of granted radio time. The first routine is triggered by the publication 410 as shown by the flowchart 1100 in FIG. 11. The second routine is triggered by each of the steps 416, 438, 440 and 454 as shown by the flowchart 1200 in FIG. 12.

Each of the first and second routines is described using the following parameters:

| Parameter | Description |
| --- | --- |
| Rate | The rate, e.g., $1/3$ means every $3^{rd}$ DRX cycle or gap. This parameter should be set based on measurement performance requirements, and is tightly coupled to the amount of radio time that is requested for each measurement occasion. |
| historyLength | The length of the history should typically be a multiple, e.g., 6 times the inverse rate. If the inverse rate is every $3^{rd}$ cycle, the length of the history would then be 18 cycles. The rationale is that to form a valid rate estimate at least a few grants need to be recorded during the history. Using the example rate $1/3$ and the length 18, we would expect 6 grants during the history. A long history will however make the algorithm try to catch up if it could not get radio time during a time interval, which might not be a desired behaviour. A long history will also consume more memory. |

-continued

| Parameter | Description |
|---|---|
| Target | The target is the number of attempts that can be made before the base priority is increased. Setting a low value, for example 2 or 3, will make the algorithm more aggressive. A typical value is 3. |
| Pmin | The minimum priority limit. A typical value is 0. |
| Pmax | The maximum priority. A typical value may be 65535, if the dynamic priority is to be represented by 16 bits. |

The first routine further depends on an external flag "forceRequest". The priority handling algorithm further comprises internal variables such as the integer "cycle" denoting the number updates or feedbacks, the integer "actualGrants", the integer "expectedGrants", the integer "nbrOfAttempts" that is the number of (unsuccessful) request attempts, the variable "timeSinceLastSuccessfulAttempt" representing the time elapsed since the last successful request attempted, and a base priority (denoted by "basePrio"). The base priority is determined by the second routine. The base priority is a base value for the first routing when determining the dynamic priority level.

It should be noted that the values of the parameters, as well as a duration of the radio time requested for each published measurement interval, may be modified when the measurement managing component receives an update of the configuration in the step 460 described above with reference to FIG. 10.

Figure 11:
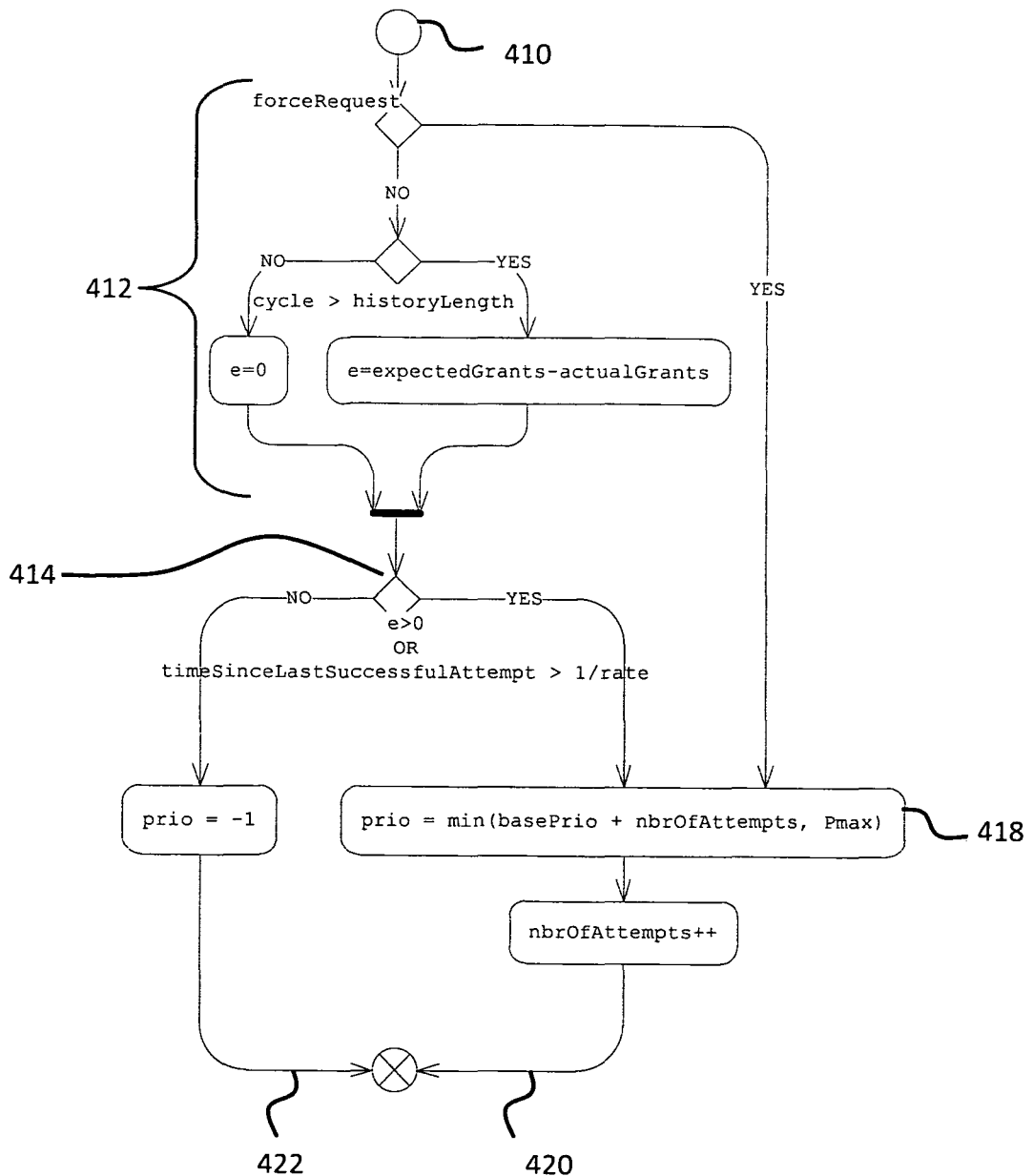
FIG. 11 shows a flowchart of a request function performed by each of the measurement managing components of the apparatus shown in FIG. 1.

The flowchart 1110 in FIG. 11 illustrates the first routine "ph_Request" on a high level. The main purpose of the routine "ph_Request" is to determine, if radio time shall be requested (i.e., the first function) and is so, with which dynamic priority level (i.e., the second function). It is also possible to externally request that radio time shall be requested using the "forceRequest" flag. In case the flag "forceRequest" is set, the routine "ph_Request" will only compute the dynamic priority level in the step 418 as shown in the flowchart 1100. In the normal case, the flag "forceRequest" is not set and the routine "ph_Request" performs the first function of assessing whether radio time is required or not according to the step 412. In more detail, the decision 414 shown in FIG. 11 will indicate the need for radio time by a non-negative dynamic priority level denoted by "prio", if either of the following two criteria is fulfilled:

the average rate during the finite history is to low (also referred to as "feedback" criterion); or
a request is required to maintain the measurement rate (also referred to as feed-forward" criterion).

The "feedback" criterion is indicated by a positive value (e>0) of an auxiliary variable e, which is defined in the step 412. The auxiliary variable e is set to zero, if the number of cycles is equal to or lower than the predefined history length N, such that the history has not yet been completed. The auxiliary variable e is also zero, if the number of actual grants according to the history equals a number of expected grants. The auxiliary variable is the difference between the number of expected grants and the number of actual grants, if the number of executed cycles exceeds the history length.

The "feed-forward" criterion is fulfilled, if the configured measurement rate (which is denoted by "rate" in above table and in the flowchart 1100) is higher than the inverse of the time since the last successful request attempt.

For example, if the measurement rate is "every 3 DRX cycles", a request is made if radio time has not been granted the last two DRX cycles. When a task is created, a state of the priority handling algorithm is initialized in such way that a radio time request is always made in the first cycle. In case the measurement rate is fractional, e.g. "every 3.2 DRX cycles", it is rounded up and the feedback routine is used to increase the base priority to meet the configured measurement rate. In other words, the feed-forward criterion will lead to a request "every 4 DRX cycles" and the feedback criterion will ensure that some additional requests are submitted to fulfil the configured measurement rate of "every 3.2 DRX cycles". It is noted that in case of an integer measurement rate (and without radio resource conflicts), the feedback routine will be passive and the requests will be made only using the feed-forward mechanism.

The dynamic priority level may be derived in the step 418 (of each of the flowcharts 402 or 1100) from a sum of the base priority and the number of unsuccessful request attempts since radio time was last granted. Moreover, the dynamic priority level may, in some embodiments, be represented by, e.g., the sixteen least significant bits of a radio scheduler priority, which further comprises a general measurement service priority represented, e.g., by the sixteen most significant bits of the radio scheduler priority. In deciding whether to grant or reject the request, the radio scheduler 130 takes the full radio scheduler priority into account. In this way it is prevented that the requests of the measurement managing components 110-116 interfere with radio time that is requested, e.g., by one of the connection control components 120-124, for the purpose of receiving and/or transmitting information. The connection control components 120-124 can use for such purposes the sixteen most significant bits of the radio scheduler priority. The dynamic priority level is limited to the maximum value Pmax. The request attempt is indicated by the non-negative dynamic priority level computed in the step 418. The number of attempts is increased by one.

In case the variable e equals zero and the time elapsed since the last successful attempt is still sufficient to meet the configured measurement rate, no request attempt is made, as indicated by setting the dynamic priority level "prio" equal to −1.

Figure 12:
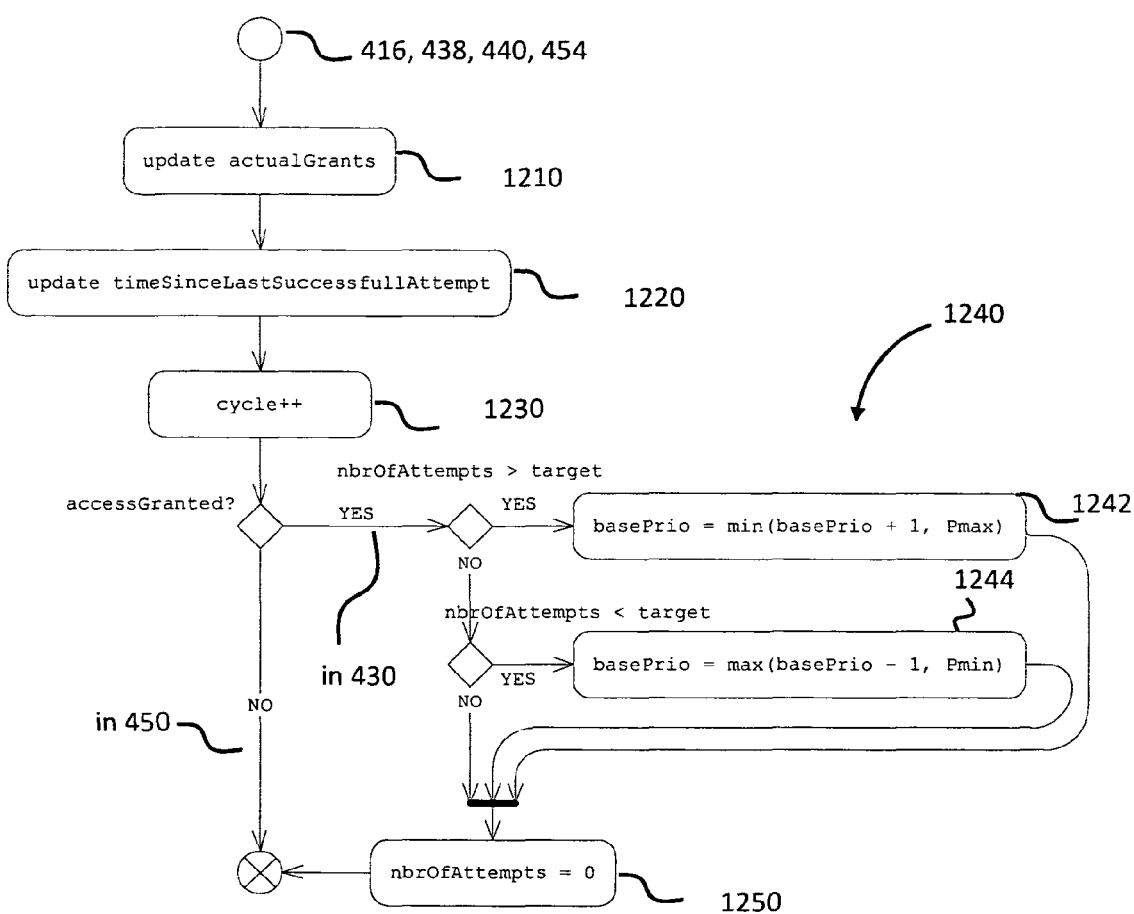
FIG. 12 shows a flowchart of a feedback function performed by each of the measurement managing components of the apparatus shown in FIG. 1.

The flowchart 1200 in FIG. 12 shows the second routine "ph_Feedback" on a high level. The general purpose of the second routine "ph_Feedback" is to update the state of the priority handling algorithm based on whether radio time was granted or not. Accordingly, the second routine is triggered by each of the updating steps 416, 438, 440 and 454 and updates the actual number of grants recorded in the history based on whether the history indicates that a corresponding request was granted or not in a step 1210. The time since the last successful request attempt is updated, e.g. based on the history, in a step 1220. The "cycle" counter is incremented in a step 1230. Since the second routine is triggered by all updating steps 416, 438, 440 and 454, the "cycle" counter indicates the total number of published measurement intervals, independent of whether a request was submitted by the corresponding one of the measurement managing components 110-116 or not, and independent of the outcome of the request if submitted.

In case the request was granted (e.g., the second routine has been triggered in the granting step 430 of the method 400), the second routine performs an update 1240 of the base priority. In case the number of unsuccessful requests attempts (denoted by "nbrOfAttempts") is too large (e.g., compared to the predefined target), the base priority is increased in a step 1242. Alternatively, if the number of request attempts is too small, the base priority is decreased in a step 1244. The number of unsuccessful attempts is then set to zero in a step 1250.

In case the request was rejected (e.g., the second routine is triggered by the step 440), the base priority stays unchanged and the number of request attempts is not reset. As a consequence, the number of attempts continuous to grow according to the first routine "ph_Request".

While the embodiment of the apparatus 100 shown in FIG. 2 comprises a single physical layer subsystem 180, an alternative embodiment of the apparatus 100 comprises several physical layer subsystems, e.g., one for each supported RAT. The several physical layer subsystem share the single radio transceiver 170 and are controlled by the single control unit 140 or at least the single radio scheduler 130, as described above.

Another embodiment of the apparatus 100 comprises several radio transceivers 170, one or several physical layer subsystems 180, one or more control units 140 and the single radio scheduler 130 described above. In addition, the radio scheduler 130 coordinates a radio usage across the several radio transceivers 170 and the one or several physical layer subsystems 180.

In yet another embodiment of the apparatus 100, there are one or several radio transceivers 170, one or several physical layer subsystems 180, one or several control units 140 and one of several radio schedulers 130. The one or several radio schedulers 130 may be implemented as one or several instances of the radio scheduler. In case of several radio schedulers 130, the radio schedulers 130 synchronize with each other.

The finite history is, in a variant compatible with all embodiments, not defined by a number N of published measurement intervals but by a length of a time frame. For example, instead of keeping track of whether a measurement over a fixed number of pilots or reference signals was carried out, the history may store an actual number of pilots or reference signals and/or a duration of the radio time that has been granted during the time frame. This may, in some embodiments, have the advantage of a more dynamic solution of conflicting requests for radio time in the published measurement interval. For example, one of the measurement managing components 110-116 may measure over three subframes in one measurement interval and may need the radio time of only one subframe in the following measurement interval.

In a variant compatible with each embodiment, the determination of the dynamic priority level in the step 418 may be based on a more general mathematical function taking into account, operating on, or depending on the number of unsuccessful request attempts and the base priority. Alternatively, or in addition, the general mathematical function may be different for some or each of different measurement managing components, different RATs and measurements (in a wide sense).

As has come apparent from the above description of embodiments, the technique discussed herein has numerous advantages. For example, it is generally complicated to achieve measurement rates that are non-integer multiples of, e.g., the DRX cycle using the conventional fixed scheduling technique. Moreover, conventional techniques are often cumbersome for "tuning" of radio time. Some embodiments may optimize, e.g., using the above technique, at least one of "radio time versus measurement accuracy" and "radio time versus performance". The former may be applied in a connected mode. The latter may be applied in an idle mode. Some embodiments may allow finding and/or optimizing a good, or even close to ideal, compromise between used radio time and achieved measurement accuracy or achieved performance.

At least some embodiments disclosed herein allow non-integer measurement rates to be defined, thus opening up for radio time optimization with high precision. The same or some other embodiments decouple the measurements towards different RATs from each other, since there is no explicit yielding of radio time from one RAT to another. For the same reason, adding one or more further RATs to the supported RATs is simplified. In some embodiments, all what is necessary for adding another RAT is to add configurations (e.g., radio time, measurement rate, etc.) for the additional RAT in each of the other measurement managing components. The "old" configurations for the set of previously supported RATs are, in some embodiments, still valid and do not have to be amended. The latter advantage contrasts to having to create totally new tables for the conventional fixed scheduling.

At least some of the embodiments result in a graceful degradation. If the radio time momentarily is restricted to less than what would be required to fulfil the measurement requirement (e.g., predefined by the standard of the RAT), all or several of the measured carriers will experience a slight degradation due to postponed measurements rather than one or a few carriers not being able to measure at all. In same or some other embodiments, this advantage may result from a co-operant behaviour of measurement managing components, since when radio time is not granted, the corresponding requesting measurement managing component will try the next published measurement interval again with an increased dynamic priority level. Moreover, at least some embodiments allow one or each of the RATs to optimize the measurements, e.g. according to the technique described in EP 10 002 939.6 for LTE, without taking the need from other RATs into account. Potential conflicts can be handled using the dynamic priority level.

The invention claimed is:

1. A method of scheduling an inter-carrier measurement in a communication network serving a mobile device over a serving carrier, the method comprising the following steps performed by the mobile device:
    publishing a measurement interval of the serving carrier by communicating the measurement interval to a multiplicity of measurement managing components of the mobile device, each of which is associated with at least one carrier;
    requesting, by at least one of the measurement managing components, radio time for the communicated measurement interval, wherein the requesting is triggered by the publication; and
    scheduling the inter-carrier measurement based on the at least one request.

2. The method of claim 1, wherein each of at least two of the measurement managing components requests radio time, each of the at least two requests including an indicator of a dynamic priority level of the requested radio time, and wherein the scheduling of the inter-carrier measurement depends on the dynamic priority levels of the at least two requests.

3. The method of claim 2, wherein the inter-carrier measurement is scheduled for the carrier associated with the measurement managing component corresponding to the request indicating the highest dynamic priority level of the at least two requests.

4. The method of claim 2, wherein the dynamic priority level is increased in response to a rejected request, wherein the dynamic priority level is computed as a base priority plus a number of unsuccessful requests.

5. The method of claim 1, wherein each measurement managing component is further associated with one Radio Access Technology (RAT), and each of the at least one carrier associated with the respective measurement managing component is a carrier of the associated RAT.

6. The method of claim 5, wherein the Radio Access Technologies include at least two of GSM, UTRA FDD, and e-UTRA, which includes at least one of e-UTRA FDD and e-UTRA TDD.

7. The method of claim 1, wherein carriers associated with different measurement managing components are different in at least one of a frequency and a Radio Access Technology associated therewith.

8. The method of claim 1, wherein each measurement managing component is responsible for all inter-carrier measurements towards at least one of the associated at least one carrier and an associated Radio Access Technology.

9. The method of claim 1, wherein the measurement managing components are co-located with the mobile device.

10. The method of claim 1, further comprising assessing, triggered by the publication, whether or not the radio time is needed for a measurement on the associated at least one carrier.

11. The method of claim 1, further comprising determining, by the requesting measurement managing component, at least one of a measurement rate, a duration for the requested radio time, and the dynamic priority level.

12. The method of claim 10, wherein each of the measurement managing components maintains a finite history of at least one of its requests and its inter-carrier measurements, and wherein at least one of the assessing and the determining depends on the finite history.

13. The method of claim 10, wherein the assessing depends on at least one of a state of the serving carrier, a configuration of the serving carrier, a number of carriers, and any combination thereof.

14. The method of claim 1, wherein the request further includes at least one of the requested radio time and parameters of the associated carrier or an associated Radio Access Technology.

15. The method of claim 1, further comprising queuing, for each measurement managing component, internal requests of the respective measurement managing component.

16. The method of claim 1, wherein the scheduling includes signaling a grant in response to the requested radio time to the requesting measurement managing component.

17. The method of claim 16, further comprising configuring, by the requesting measurement managing component, a physical layer subsystem to carry out the requested inter-carrier measurement for the associated carrier or an associated Radio Access Technology in response to the grant.

18. The method of claim 1, wherein the measurement interval includes at least one of a transmission gap, a measurement gap, and a discontinuous reception cycle, or DRX cycle, of the serving carrier.

19. A non-transitory computer-readable medium comprising, stored thereupon, program code portions that, when executed on a mobile device, cause the mobile device to:
    publish a measurement interval of the serving carrier by communicating the measurement interval to a multiplicity of measurement managing components of the mobile device, each of which is associated with at least one carrier;
    request, by at least one of the measurement managing components, radio time for the communicated measurement interval, wherein the request is triggered by the publishing; and
    schedule the inter-carrier measurement based on the at least one request.

20. An apparatus for scheduling an inter-carrier measurement in a communication network serving a mobile device over a serving carrier, the apparatus being embedded in the mobile device and comprising:
    a multiplicity of measurement managing components, each of which is associated with at least one carrier and adapted to request radio time;
    a serving connection control component adapted to publish a measurement interval of the serving carrier by communicating the measurement interval to the multiplicity of measurement managing components of the mobile device, wherein at least one of the measurement managing components is adapted to request radio time for the communicated measurement interval, and wherein the request is triggered by the publishing; and
    a radio scheduler adapted to schedule the inter-carrier measurement based on the at least one request.

21. The apparatus of claim 20, wherein each of at least two of the measurement managing components requests radio time, each of the at least two requests including an indicator of a dynamic priority level of the requested radio time, and wherein the scheduling of the inter-carrier measurement depends on the dynamic priority levels of the at least two requests.

22. The apparatus of claim 21, wherein the inter-carrier measurement is scheduled for the carrier associated with the measurement managing component which request indicates the highest dynamic priority level of the at least two requests.

23. The apparatus of claim 20, wherein each of the at least one request is submitted to the radio scheduler.

24. The apparatus of claim 20, further comprising a multiplicity of connection control components, each of which is associated with at least one of the carriers and a Radio Access Technology.

25. The apparatus of claim 24, wherein each of the connection control components is adapted to process data according to the at least one of associated carrier and associated Radio Access Technology.

26. The method of claim 11, wherein the determining depends on at least one of a state of the serving carrier, a configuration of the serving carrier, a number of carriers, and any combination thereof.

* * * * *